United States Patent
Aoyama

[11] Patent Number: 6,077,585
[45] Date of Patent: Jun. 20, 2000

[54] OPTICAL RECORDING MEDIUM AND METHOD OF PREPARING SAME

[75] Inventor: Akira Aoyama, Nagano-ken, Japan

[73] Assignee: Seiko Epson Corporation, Tokyo, Japan

[21] Appl. No.: 07/855,442

[22] Filed: Mar. 19, 1992

Related U.S. Application Data

[63] Continuation of application No. 07/619,815, Nov. 29, 1990, abandoned, which is a continuation of application No. 07/327,438, Mar. 23, 1989, abandoned, which is a continuation of application No. 07/052,932, May 22, 1987, abandoned, which is a continuation-in-part of application No. 06/819,659, Jan. 17, 1986, Pat. No. 4,801,499.

[30] Foreign Application Priority Data

Jan. 24, 1985 [JP] Japan ................................ 60-11355
Aug. 19, 1985 [JP] Japan ............................... 60-181351
May 28, 1986 [JP] Japan ............................... 61-122752

[51] Int. Cl.$^7$ ...................................... G11B 5/66
[52] U.S. Cl. ................ 428/64.4; 428/64.7; 428/65.1; 428/65.2; 428/698; 428/900; 360/131; 360/134; 360/135; 365/122; 369/13; 369/288; 346/135.1; 346/76 L; 204/192.26; 204/192.27
[58] Field of Search ..................... 428/900, 698, 428/64.4, 64.7, 65.1, 65.2; 369/13, 288; 365/122; 360/131, 134, 135; 346/135.1, 76 L; 204/192.26, 192.27

[56] References Cited

U.S. PATENT DOCUMENTS

| | | | |
|---|---|---|---|
| 4,390,600 | 6/1983 | Ohta et al. | 428/621 |
| 4,610,912 | 9/1986 | Takahashi et al. | 428/213 |
| 4,658,388 | 4/1987 | Ishiwatari et al. | 369/13 |
| 4,680,742 | 7/1987 | Yamada et al. | 369/13 |

OTHER PUBLICATIONS

Cuomo, "Antireflection Coatings for the Enhancement of Magneto–Optic Effects in Amorphous Rare–Earth Transition Metal Alloys" IBM TDB V51. 16, No. 5, Oct. 1973, p. 1442.

*Primary Examiner*—Leszek Kiliman
*Attorney, Agent, or Firm*—Stroock & Stroock & Lavan LLP

[57] ABSTRACT

An optical recording medium having at least one aluminum nitride and silicon nitride composite dielectric layer is provided. The amount of aluminum nitride in the dielectric layer, x, is more than zero and less than or equal to about 95 mol %. The amount of silicon nitride in the layer is represented as (100−x) and is equal to or greater than about 5 and less than 100 mol %. The refractive index of the composite dielectric layer is between about 1.70 and 2.15. The composite dielectric layer is sandwiched between a transparent support such as a plastic transparent support and an optical recording layer adapted to be irradiated by laser light in order to read, write or erase information in order to protect the recording layer.

21 Claims, 4 Drawing Sheets

OPTICAL RECORDING MEDIUM AND METHOD OF PREPARING SAME

This is a continuation of application Ser. No. 07/619,815, filed Nov. 29, 1990 now abandoned; which is a continuation of application Ser. No. 07/327,438, filed Mar. 23, 1989 now abandoned, which is a continuation of application Ser. No. 07/052,932, filed May 22, 1987 now abandoned, which is a continuation-in-part of application Ser. No. 06/819,659 filed on Jan. 17, 1986 now U.S. Pat. No. 4,801,499 issued on Jan. 31, 1989.

BACKGROUND OF THE INVENTION

The present invention relates to optical recording media having composite dielectric layers and more particularly, to an improved optical recording medium having a composite dielectric layer formed of aluminum nitride and silicon nitride having a specific composition and refractive index.

Information can be written onto prior art optical recording media by irradiation of condensed laser light onto a perpendicular magnetic recording layer in order to invert the magnetization of the recording layer. Alternatively, laser light irradiated onto the recording layer can be used to change the crystalline structure of the layer. Specifically, the crystalline structure can be changed from crystalline to amorphous, from amorphous to crystalline, from hexagonal to cubic, from cubic to hexagonal and the like by making holes, forming bubbles or otherwise transforming the recording medium using laser phase transition.

Such optical recording media generally have plastic substrates or supports including polycarbonate, polymethylmethacrylate and epoxy resin supports with guide grooves formed therein. The plastic supports can be formed by injection molding in order to reduce cost and permit mass production. However, plastic supports are not completely satisfactory because they are susceptible to moisture absorption and are gas permeable. As a result, magneto-optic recording layers containing alloy films of rare earth metals and transition metals such as GdTbFe, TbFeCo, GdTbFeCo, DyFeCo, NdDyFeCo and NdDyFeCoTi are readily attacked by atmospheric moisture and gasses and the magnetic properties deteriorate significantly.

Dielectric oxide layers are provided between the plastic supports and the magneto-optic recording layers thereon in order to improve corrosion resistance and overcome the disadvantages of the synthetic resin supports. The protective effect of such dielectric layers is not completely satisfactory because free oxygen in the dielectric oxide layer tends to oxidize the optical recording layer.

Alternatively, non-oxide dielectric films such as silicon nitride, aluminum nitride and zinc sulfide have been formed on plastic supports. These non-oxide dielectric films do not completely adhere to the support and recording media provided on the dielectric films crack as a result. This method is therefore not suitable for practical use.

Accordingly, it is desirable to provide a composite dielectric layer that overcomes the disadvantages of prior art dielectric layers.

SUMMARY OF THE INVENTION

Generally speaking, in accordance with the invention, an optical recording medium having an aluminum nitride and silicon nitride composite dielectric layer is provided. The amount of aluminum nitride in the dielectric layer, x, is more than zero and less than or equal to about 95 mol %. The amount of silicon nitride in the layer is represented as (100−x) and is equal to or greater than about 5 and less than 100 mol %. The refractive index of the composite dielectric layer is between about 1.70 and 2.15. The composite dielectric layer is sandwiched between a transparent support such as a plastic transparent support and an optical recording layer adapted to be irradiated by laser light in order to read, write or erase information in order to protect the recording layer.

It is, therefore, an object of the invention to provide an improved composite dielectric layer.

Another object of the invention is to provide a composite dielectric layer formed of aluminum nitride and silicon nitride and having a specific composition and refractive index.

A further object of the invention is to provide a composite dielectric layer that adheres to a plastic support.

Still another object of the invention is to provide a composite dielectric layer that does not oxidize the optical recording layer.

Still a further object of the invention is to provide composite dielectric layer that protects a recording layer from deterioration in carrier-to-noise ratio and bit error rate over an extended period of time.

Yet another object of the invention is to provide a composite dielectric layer that does not crack even after an extended period of time.

Yet a further object of the invention is to provide a method of preparing an improved composite dielectric layer.

Still other objects and advantages of the invention will in part be obvious and will in part be apparent from the specification.

The invention accordingly comprises a product possessing the characteristics, properties, and the relation of components which will be exemplified in the product hereinafter described and the several steps and the relation of one or more of such steps with respect to each of the others, and the scope of the invention will be indicated in the claims.

DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENT

Figure 1:
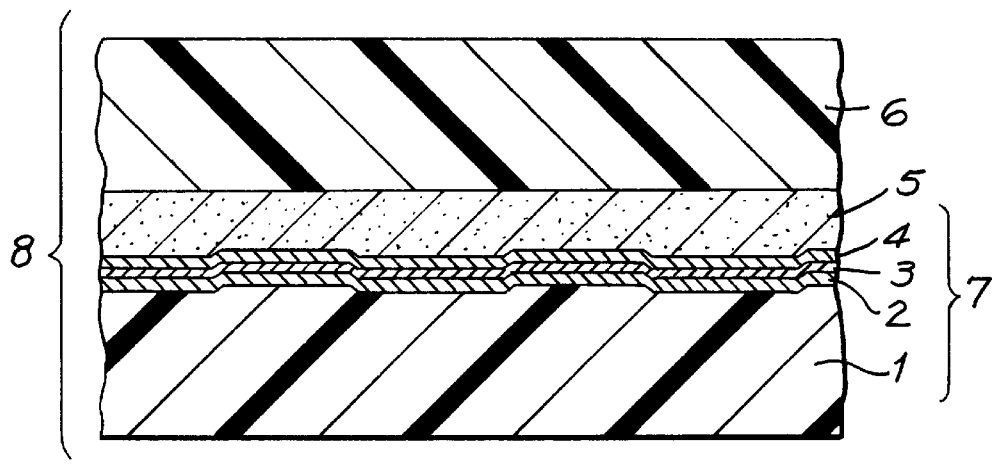
FIG. 1 is a sectional view of a magneto-optic recording medium constructed and arranged in accordance with the invention.

The recording medium of the invention has a dielectric layer having a refractive index between about 1.70 and 2.15 sandwiched between a transparent support and an optical recording layer. The amount of aluminum nitride, x, is more than zero and less than or equal to about 95 mol %. The amount of silicon nitride is (100–x) or equal to or greater than about 5 and less than 100 mol %.

Composite dielectric films having a refractive index of less than about 1.70 are porous and cause deterioration of the optical recording medium. On the other hand, composite dielectric films having a refractive index of greater than about 2.15 can contain unreacted aluminum or silicon which causes the optical constant to change during accelerated aging (weatherability) testing and indicates that the optical recording medium will change over time. Thus, it is necessary for the refractive index of the composite dielectric layer to be between about 1.70 and 2.15.

Furthermore, when the aluminum nitride content of the composition exceeds 95 mol %, the film exhibits cracks during accelerated aging tests. On the other hand, when the silicon nitride content of the composition approaches 100 mol %, the photo polymer (2P) solution used to adhere the substrates together peels after adhesion because silicon nitride layers develop pinholes and the 2P solution attacks the recording layer through the pinholes.

The recording media and composite dielectric layers of the invention will be better understood with reference to the following examples. These examples are presented for illustration only and are not intended to be construed in a limiting sense.

EXAMPLE 1

An optical recording medium 8 having the structure shown in FIG. 1 in accordance with the invention was prepared as follows. A polycarbonate support 1 was grooved to a groove pitch of 1.6 μm, a groove width of 0.8 μm and a groove depth of 600 Å. A first aluminum nitride/silicon nitride composite dielectric film 2 having a thickness of 1000 Å was formed on the grooved side of polycarbonate support 1. An NdDyGdFeCoTi recording layer 3 having a thickness of 400 Å was formed on composite dielectric film 2. A second aluminum nitride/silicon nitride composite dielectric film 4 having a thickness of 1000 Å was formed on recording layer 3. Polycarbonate support 1, first dielectric layer 2, recording layer 3 and second dielectric layer 4 formed an optical transmission substrate 7. The grooved surface of optical transmission substrate 7 was adhered to a smooth polycarbonate support 6 using a photo polymer (2P) resin 5 to provide optical recording medium 8.

Dielectric layers 2 and 4 were formed by sputtering using either alloy targets or sintered targets of aluminum and silicon as sputtering targets to form a composite dielectric layer of aluminum nitride and silicon nitride. Alloy targets were preferred unless the ratio of aluminum to silicon was not suitable for alloying. In those cases, sintered targets were used.

The sputtering conditions were:

| | |
|---|---|
| Argon pressure | 2.5 mTorr |
| Partial nitrogen pressure | 0.5 mTorr |
| Type of sputtering | Reactive RF magnetron sputtering |
| Power | Constant at 500 W |

A variety of dielectric layer compositions were prepared. The ratio of aluminum to silicon in the compositions of the sputtering targets were as follows:

| Run | Composition* |
|---|---|
| (1) | Al:Si = 0.1:99.9 mol % |
| (2) | Al:Si = 2:98 mol % |
| (3) | Al:Si = 10:90 mol % |
| (4) | Al:Si = 20:80 mol % |
| (5) | Al:Si = 30:70 mol % |
| (6) | Al:Si = 60:40 mol % |
| (7) | Al:Si = 80:20 mol % |
| (8) | Al:Si = 90:10 mol % |
| (9) | Al:Si = 95:5 mol % |
| (10) | Al:Si = 95.1:4.9 mol % |
| (11) | Al:Si = 96:4 mol % |
| (12) | Al:Si = 98:2 mol % |

*The precise composition of the dielectric layers resulting from the use of specific sputtering targets was not conclusively demonstrated. However, it is assumed that the approximate ratio of aluminum nitride to silicon nitride in the resultant dielectric layers was approximately the same as the proportion of aluminum to silicon in the sputtering target.

"Aluminum nitride", as used herein, refers to mixtures of aluminum and nitrogen which occur in various complex compositions in an amorphous state. Specifically, some of the aluminum nitride is in the form of AlN and other portions are other combinations, mixtures and compounds of aluminum and nitrogen. Similarly, "silicon nitride" refers to combinations, mixtures and compounds of silicon and nitrogen and not specifically to $Si_3N_4$.

The photo polymer resin used to adhere optical transmission substrate 7 to ungrooved polycarbonate support 6 is an adhesive resin which is transformed from a monomer to a polymer when cured using ultraviolet light. The photo polymer resin solution (2P solution) has a low viscosity before curing and a higher viscosity after curing. When used with silicon nitride dielectric layers which do not adhere strongly to a substrate, the 2P solution causes the dielectric layer to be peeled from the substrate.

The media samples of Runs (1) to (12) were subjected to accelerated aging tests in a chamber maintained at a controlled temperature and humidity of 60° C. and 90% RH, respectively. The samples were examined after 1000 hours to determine whether they exhibited cracks. The samples in Runs (10), (11) and (12) having aluminum to silicon proportions of 95.1:4.9 mol %; 96:4 mol %; and 98:2 mol % exhibited cracking after 1000 hours.

For comparison, an optical recording medium having dielectric layers composed of 100% silicon was prepared and subjected to an accelerated aging test of the type described. This medium also exhibited cracks. As has been demonstrated, when the amount of aluminum nitride, x, is greater than 95 mol % or is not present at all, the dielectric layer exhibited cracking. Accordingly, the amount of aluminum nitride, x, should be more than zero and less than or equal to about 95 mol %. Conversely, the amount of silicon nitride, (100–x), should be equal to or greater than about 5 and less than 100 mol %. The composite dielectric layers had a constant refractive index of 2.0.

Figure 2:
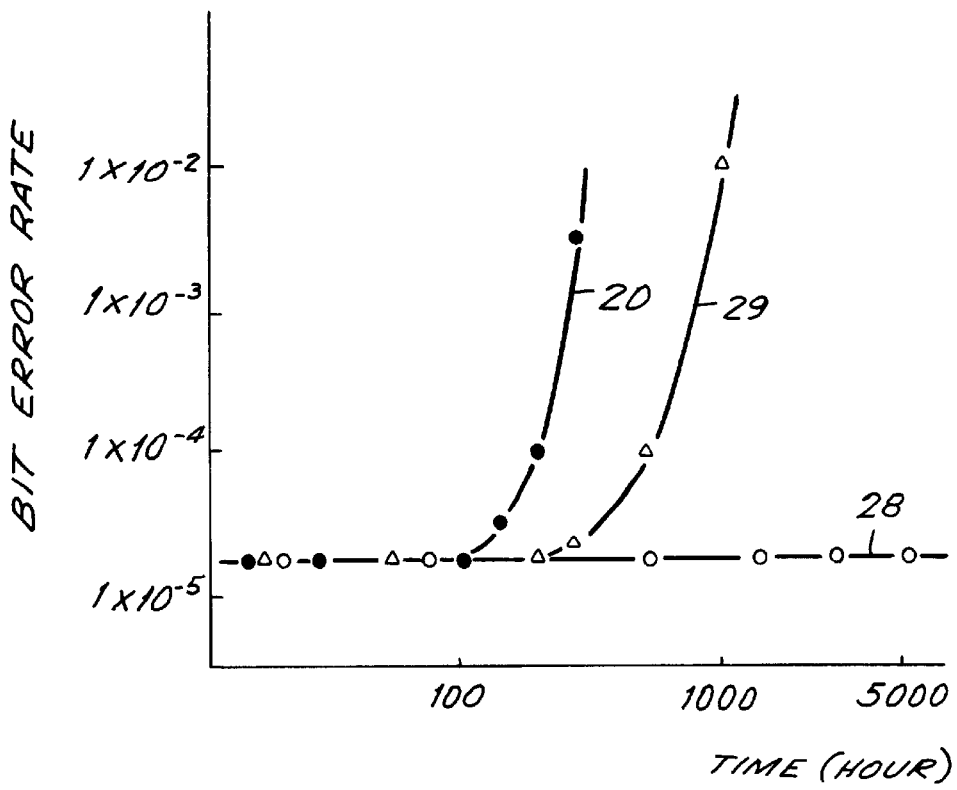
FIG. 2 is a graph showing Bit Error Rate as a function of time for a magneto-optic recording medium constructed and arranged in accordance with the invention.

FIG. 2 shows the change in Bit Error Rate measured as a function of time when the samples were subjected to the accelerated aging test conducted at a constant temperature of 60° C. and a relative humidity of 90% as described above. The ordinate of the graph shows the Bit Error Rate where a bit is 1.0 μm in length and the abscissa shows the elapsed time. Curve 28 represents optical recording media having composite aluminun nitride/silicon nitride dielectric layers wherein the amount of aluminum was 0.1, 2, 10, 20, 30, 60, 80, 90 or 95 mol %. The optical recording medium represented by curve 20 had silicon nitride dielectric layers. The optical recording medium represented by curve 29 had a composite dielectric layer of aluminum nitride and silicon nitride wherein the proportion of aluminum in the target for preparing the medium was 95.1, 96 or 98 mol %.

The recording media prepared according to the invention and represented by curve 28 do not show a change in Bit Error Rate even after 5000 hours indicating reliability for over 50 years. Media formed from a target in which the proportion of aluminum is greater than about 95 mol % as represented by curve 29 exhibited cracks after 200 hours and were not suitable for practical use. Media prepared using silicon nitride dielectric layers represented by curve 20 began to exhibit cracks after 100 hours.

Inductively coupled plasma (ICP) analysis performed on media prepared according to the invention indicated that the dielectric layers have the same composition ratio as the sputtering targets from which they are formed. ICP is a method of analysis for specifying the type and amount of an element by the color and intensity of a flame. This is accomplished by burning a solution in which an experimental material is dissolved.

EXAMPLE 2

Figure 3:
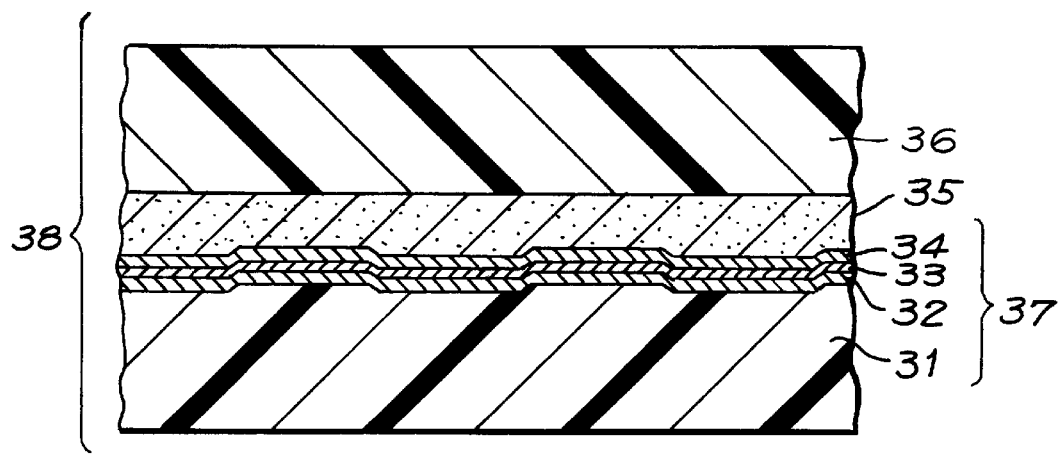
FIG. 3 is a sectional view of a magneto-optic recording medium constructed and arranged in accordance with an alternate embodiment of the invention.

FIG. 3 shows the structure of another optical recording medium 38 which is similar to the structure of optical recording medium 8 shown in Example 1 except for the support material. Recording medium 38 includes a polymethylmethacrylate (PMMA) grooved support 31 and a smooth polymethylmethacrylate support 36 in place of polycarbonate supports 1 and 6 used in recording medium 8 of Example 1. Otherwise, recording medium 38 is the same as recording medium 8 of Example 1.

Figure 4:
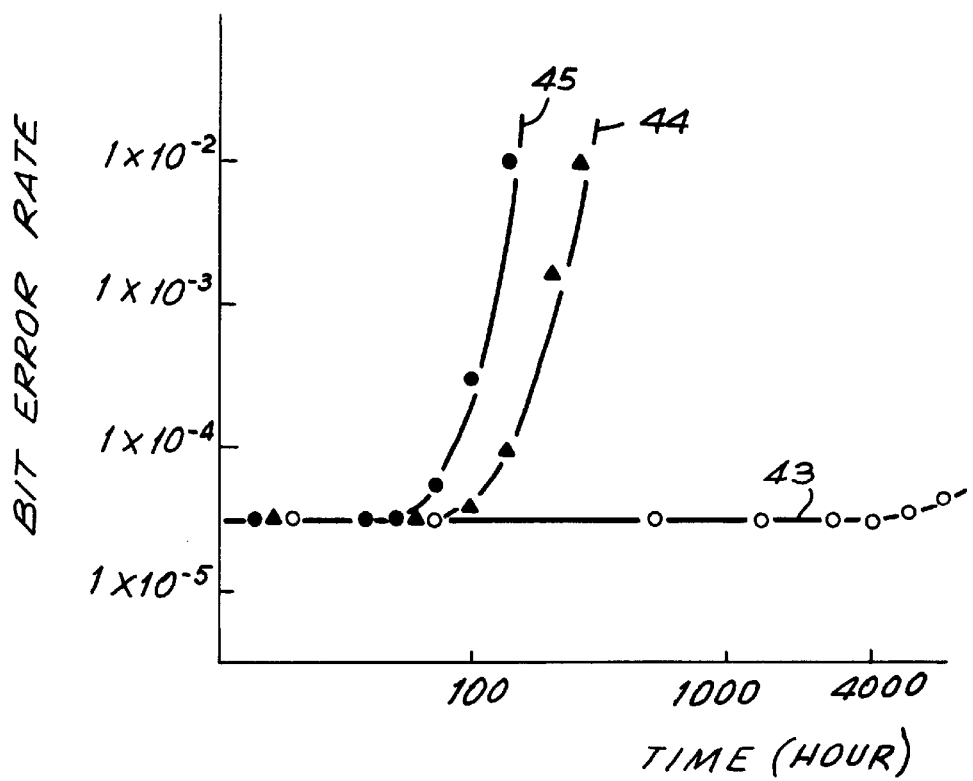
FIG. 4 is a graph showing Bit Error Rate as a function of time for a magneto-optic recording medium constructed and arranged in accordance with the invention.

FIG. 4 is a graph showing Bit Error Rate as a function of time when recording media 38 were subjected to an accelerated aging test at 60° C. and 90% relative humidity as described in Example 1. Curve 43 shows the results of accelerated aging testing of an optical recording medium 38 having dielectric layers 32 and 34 containing between about 0.1 and 95 mol % of aluminum. The Bit Error Rate for these media began to increase after about 4,000 hours had passed.

Curve 44 shows the results of accelerated aging testing when dielectric layers 32 and 34 contained more than about 95 mol % aluminum. These media began to exhibit cracks after 1,000 hours had elapsed. Curve 45 shows the results of accelerated aging testing on an optical recording media having dielectric layers 32 and 34 formed only of silicon nitride. These media began to exhibit cracks after only 60 hours.

Media 38 deteriorated sooner than media 8 of Example 1 due to the use of polymethylmethacrylate supports 31 and 36. However, in spite of the use of polymethylmethacrylate supports, reliability for up to 40 years is ensured when the media were prepared using dielectric layers in accordance with the invention.

EXAMPLE 3

Optical recording media having the structure 8 shown in FIG. 1 and prepared as described in Example 1 were prepared except that the refractive index of dielectric layers 2 and 4 was evaluated using a sputtering target contained 20 mol % of aluminum and 80 mol % of silicon. The refractive index of dielectric layers 2 and 4 was adjusted by changing the argon pressure and partial pressure of nitrogen during sputtering. An accelerated aging test was conducted at 60° C. and 90% relative humidity as described in Example 1.

Figure 5:
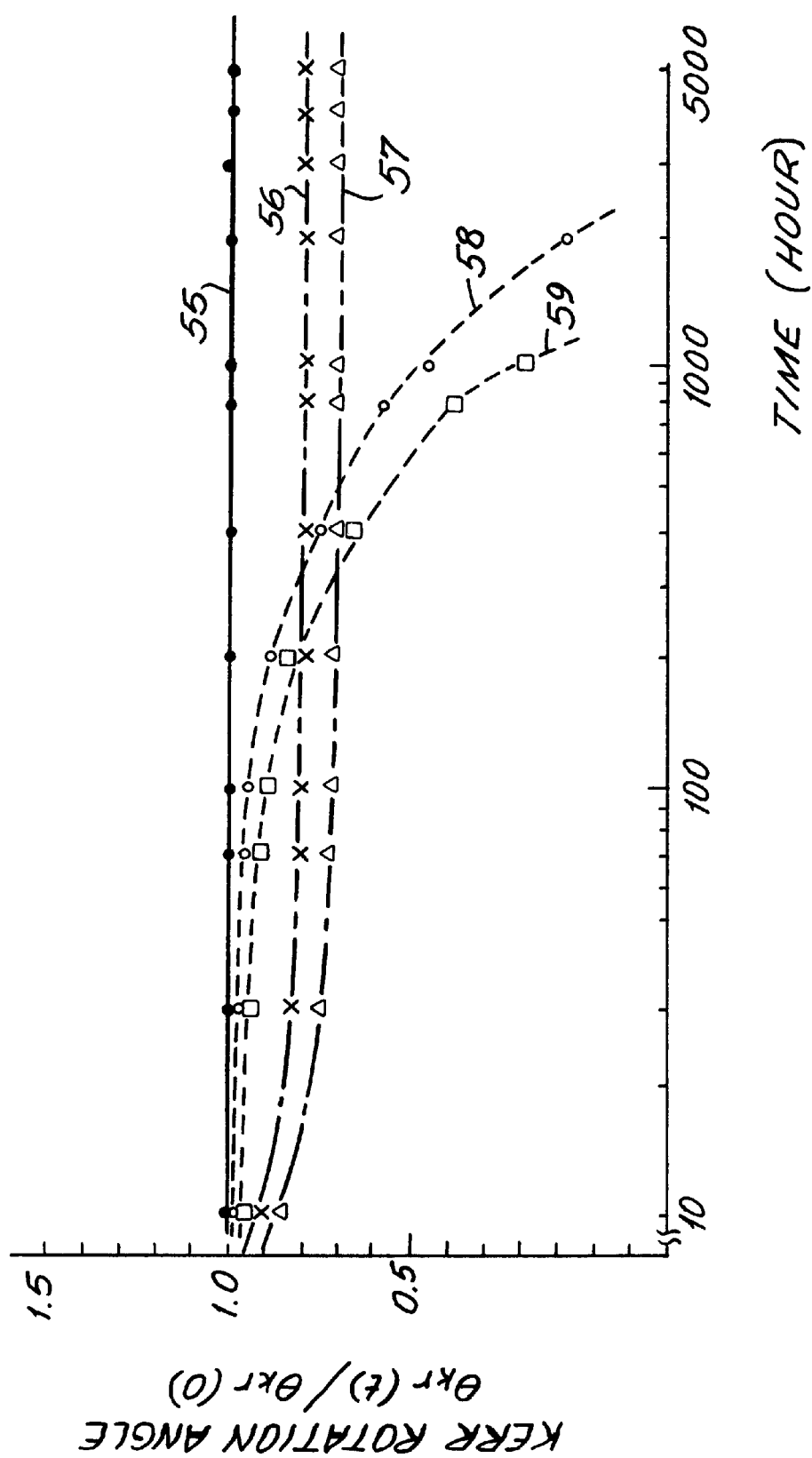
FIG. 5 is a graph showing Kerr Rotation Angle as a function of time for a magneto-optic recording medium constructed and arranged in accordance with the invention.

FIG. 5 is a graph showing the relationship between Kerr rotation angle measured from the substrate side of the optical recording media as a function of time. Kerr rotation angle is shown as the ratio of Kerr rotation angle at time t, $\theta_{kr(t)}$ to Kerr rotation angle at time 0, $\theta_{kr(0)}$. Kerr rotation angle at time t is the angle after time t has elapsed. Kerr rotation angle at time 0 is the angle when the film has just been completed.

Curve 55 shows the results for optical recording media having composite dielectric layers $Al_{20}Si_{80}N$ with refractive indices, n, of 2.15, 2.01, 1.90, 1.85, 1.80 and 1.70, respectively. Curve 56 shows the results for an optical recording medium using composite dielectric layers with refractive indices, n, of 2.24. Curve 57 shows the results for an optical recording medium using composite dielectric layers having refractive indices, n, of 2.31. Curve 58 shows the results for optical recording media using composite dielectric layers having refractive indices, n, of 1.69 or 1.65. Curve 59 shows the results for optical recording media using composite dielectric layers having refractive indices, n, of 1.63 or 1.60.

As can be seen from the graph, optical recording media prepared in accordance with the invention having a refractive index between about 1.70 and 2.15 do not change even after 5,000 hours have passed. On the other hand, optical recording media represented by curves 56 and 57 having refractive indices of greater than 2.15 change after the initial time period of the accelerated aging test, i.e. after 10 to 30 hours, and the ratio of $\theta_{kr(t)}/\theta_{kr(0)}$ decreases as a result. Dielectric layers having refractive indices of greater than 2.15 contain unreacted aluminum or silicon which change into stable oxides during the accelerated aging test. As a result, $\theta_{kr(t)}$ changes and affects the optical recording properties of the media, i.e. the carrier-to-noise (C/N) ratio.

The optical recording media represented by curves 58 and 59 having a refractive index of less than 1.70 began to change after about 100 hours and $\theta_{kr(t)}$ approached 0. This is due to the fact that a dielectric layer having a refractive index of less than about 1.70 exhibits porous film formation and moisture or oxygen enters the film during the accelerated aging test. As a result, the optical recording layer deteriorates and $\theta_{kr(t)}$ changes. The carrier-to-noise ratio is also affected.

Figure 6:
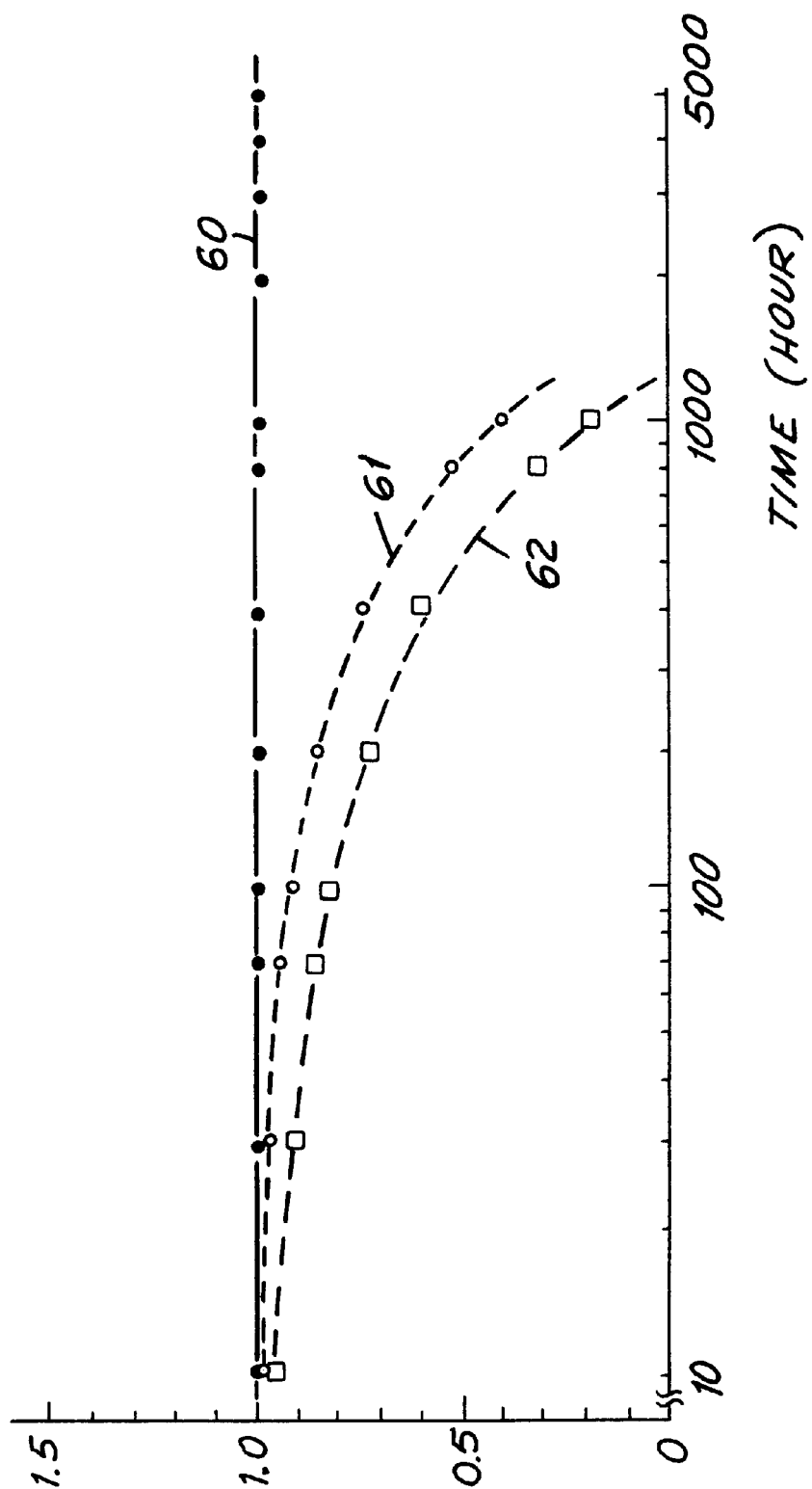
FIG. 6 is a graph showing Coercivity as a function of time for a magneto-optic recording medium constructed and arranged in accordance with the invention.

FIG. 6 is a graph showing the relationship between coercivity of optical recording media as a function of time. The ratio of coercivity Hc(t) which is the coercivity after time t has passed to coercivity Hc(0) which is the coercivity when the film has just been completed is plotted as a function of time t.

Curve 60 represents recording media having dielectric layers with refractive indices, n, of 2.15, 2.01, 1.90, 1.85, 1.80, 1.70, 2.24 and 2.31. Curve 61 represents optical recording media having dielectric layers with refractive indices, n, of 1.69 and 1.65. Curve 62 represent optical recording media with dielectric layers having refractive indices, n, of 1.63 or 1.60. As can be seen, the coercity of recording media with dielectric layers whose refractive index, n, is less than 1.70 change with time because the dielectric layers form porous films which cause the magneto-optic recording layer to deteriorate. This is particularly true where the magneto-optic recording layer includes more richly transition metal elements than that under the condition of compensation composition. On the other hand, the coercivity of media with dielectric layers having refractive indices, n, of greater than about 1.70 are stable for extended periods of time. However, media having refractive indices, n, of greater than 2.15 are not suitable for use as dielectric layers for the reasons explained in connection with FIG. 5. None of the media used in this Example exhibited cracks even after 5,000 hours of accelerated aging testing.

The composite dielectric layers tested were formed using targets consisting of $Al_{20}Si_{80}$ and the refractive indices were changed as indicated. When sputtering targets formed from $Al_{0.1}Si_{99.9}$; $Al_2Si_{98}$; $Al_{10}Si_{90}$; $Al_{20}Si_{80}$; $Al_{30}Si_{70}$; $Al_{60}Si_{40}$; $Al_{80}Si_{20}$; $Al_{90}Si_{10}$ and $Al_{95}Si_5$ mol % were used, similar results were obtained. Accordingly, it can be seen that dielectric layers having refractive indices between about 1.70 and 2.15 are most suitable for use as protective layers.

The invention is not limited to the Examples discussed. Other polymer supports can be used in place of the polycarbonate and polymethylmethacrylate supports shown and can include epoxy resin supports, amorphous polyolefin supports and glass supports. Similar effects are obtained regardless of the type of support used.

In addition, the optical transmission substrate and ungrooved support can be adhered to each other by adhesives other than the photo polymer adhesive cured by ultraviolet light described. The disk can be adhered as an air sandwich wherein the optical transmission substrate and ungrooved support are adhered only at their respective edges with air in between.

The optical recording layers can include NdDyGdFeCoTi or magneto-optic recording layers such as TbFeCo, GdTbFeCo and the like. The invention can also be applied to phase transition type optical recording media in addition to the magneto-optic recording media shown. Finally, the Examples show formation of a composite dielectric layer by nitrogen reactive sputtering using alloy or sintered targets of aluminum and silicon. Alternatively, co-reactive sputtering using an aluminum target and a silicon target can be performed. Sintered targets of aluminum nitride and silicon nitride can also be used. Alternatively, the dielectric layers can be formed by deposition methods.

Optical recording media prepared in accordance with the invention do not deteriorate over extended periods of time. Specifically, such media do not exhibit cracks and do not experience deterioration in the carrier-to-noise ratio or the Bit Error Rate for periods of up to about 50 years. The reliability of recording media over extended periods of time is thereby greatly improved.

It will thus be seen that the objects set forth above, among those made apparent from the preceding description, are efficiently attained and, since certain changes may be made in carrying out the above method and in the composition set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. An optical recording medium comprising:
    a first transparent support;
    a first composite dielectric layer formed on the transparent support;
    an optical recording layer formed on the first composite dielectric layer;
    a second composite dielectric layer formed on the optical recording layer so that the first transparent support, first composite dielectric layer, optical recording layer and second composite dielectric layer form an optical transmission substrate;
    a second transparent support; and
    an adhesive provided adjacent the second composite dielectric layer of the optical transmission substrate and the second transparent support to adhere the optical transmission substrate to the second transparent support;
    wherein the composite dielectric layers are formed of x mol % of aluminum nitride and (100–x) mol % of silicon nitride such that x is greater than 0 and less than or equal to about 95 mol % and the refractive index of the composite dielectric layer is between 1.70 and 2.15.

2. The optical recording medium of claim 1, wherein the dielectric layers are formed by sputtering.

3. The optical recording medium of claim 2, wherein sputtering is performed using an aluminum-silicon alloy sputtering target.

4. The optical recording medium of claim 2, wherein sputtering is performed using a sintered aluminum-silicon sputtering target.

5. The optical recording medium of claim 2, wherein the sputtering is reactive ion sputtering under argon atmosphere and partial nitrogen pressure.

6. The optical recording medium of claim 2, wherein the composite dielectric layers are formed using an aluminum target and a silicon target.

7. The optical recording medium of claim 1, wherein the supports are selected from the group consisting of polycarbonate, polymethylmethacrylate, epoxy resin, amorphous polyolefin and glass.

8. The optical recording medium of claim 1, wherein the first transparent support is grooved and the first dielectric layer is formed on the grooved side of the support.

9. The optical recording medium of claim 1, wherein the optical recording layer is selected from the group consisting of NdDyGdFeCoTi, TbFeCo and GdTbFeCo.

10. The optical recording medium of claim 1, wherein the adhesive is a photo polymer resin.

11. The optical recording medium of claim 10, wherein the photo polymer resin is cured using ultraviolet light.

12. A composite dielectric layer for use in an optical recording medium comprising x mol % of aluminum nitride and (100–x) mol % of silicon nitride such that x is greater than 0 and less than or equal to about 95 mol % and the refractive index of the composite dielectric layer is between about 1.70 and 2.15.

13. The composite dielectric layer of claim 12, wherein the composite dielectric layer is provided between a transparent support and an optical recording layer.

14. The composite dielectric layer of claim 12, wherein the composite dielectric layer is provided between an optical recording layer and an adhesive.

15. An optical recording medium having at least a first transparent support, a dielectric layer on the transparent support, and an optical recording layer on the dielectric layer, the improvement which comprises:
    a dielectric layer formed of x mol % of aluminum nitride and (100–x) mol % of silicon nitride such that x is greater than 0 and less than or equal to about 95 mol % and the refractive index of the composite dielectric layer is a value above 1.70 and less than 2.15.

16. The optical recording medium of claim 15, wherein the optical recording medium further includes a second dielectric layer on the recording layer and a second transparent support on the second dielectric layer, wherein the second dielectric layer is a composite dielectric layer of a composition consisting essentially of x mol % of aluminum nitride and (100–x) mol % of silicon nitride such that x is greater than 0 and less than or equal to about 95 mol % and the refractive index of the composite dielectric layer is a value above about 1.70 and less than 2.15.

17. A method of preparing a composite dielectric layer comprising:

sputtering a target consisting essentially of x mol % of aluminum and (100–x) mol % of silicon such that x is greater than 0 and less than or equal to about 95 mol % to form a dielectric layer having a composition consisting essentially of about x mol % of aluminum nitride and about (100–x) mol % of silicon nitride and a refractive index of a value above about 1.70 and less than 2.15.

18. The method of claim 17, wherein the sputtering target is an aluminum-silicon alloy sputtering target.

19. The method of claim 17, wherein sputtering is performed under argon atmosphere and partial nitrogen pressure and wherein the refractive index of the dielectric layer is adjusted by regulating the argon atmosphere and partial nitrogen pressure during sputtering.

20. An optical recording medium comprising:

a first transparent support;

a first composite dielectric layer formed on the transparent support;

an optical recording layer formed on the first composite dielectric layer; and a second composite dielectric layer formed on the optical recording layer so that the first transparent support, first composite dielectric layer, optical recording layer and second composite dielectric layer form an optical transmission substrate;

wherein the composite dielectric layers are compositions consisting essentially of x mol % of aluminum nitride and (100–x) mol % of silicon nitride such that x is greater than 0 and less than or equal to about 95 mol % and the refractive index of the composite dielectric layer is a value between about 1.70 and about 2.15.

21. An optical recording medium comprising:

a first transparent support;

a first composite dielectric layer formed on the transparent support;

an optical recording layer formed on the first composite dielectric layer; and a second composite dielectric layer formed on the optical recording layer so that the first transparent support, first composite dielectric layer, optical recording layer and second composite dielectric layer form an optical transmission substrate;

wherein the composite dielectric layers are formed of x mol % of aluminum nitride and (100–x) mol % of silicon nitride such that x is greater than 0 and less than or equal to about 95 mol % and the refractive index of the composite dielectric layer is between 1.70 and 2.01.

* * * * *